US007758751B1

(12) United States Patent
Liu et al.

(10) Patent No.: US 7,758,751 B1
(45) Date of Patent: Jul. 20, 2010

(54) UV-CROSS-LINKED MEMBRANES FROM POLYMERS OF INTRINSIC MICROPOROSITY FOR LIQUID SEPARATIONS

(75) Inventors: Chunqing Liu, Schaumburg, IL (US); Stephen T. Wilson, Libertyville, IL (US); David A. Lesch, Hoffman Estates, IL (US)

(73) Assignee: UOP LLC, Des Plaines, IL (US)

( * ) Notice: Subject to any disclaimer, the term of this patent is extended or adjusted under 35 U.S.C. 154(b) by 903 days.

(21) Appl. No.: 11/564,672

(22) Filed: Nov. 29, 2006

(51) Int. Cl.
*B01D 63/00* (2006.01)
(52) U.S. Cl. .................. 210/321.6; 95/45; 95/49; 96/4; 96/14
(58) Field of Classification Search .......... 95/45, 95/49; 96/4, 14; 210/321.6
See application file for complete search history.

(56) References Cited

U.S. PATENT DOCUMENTS

| | | | |
|---|---|---|---|
| 3,567,632 A | 3/1971 | Richter et al. ............. 210/23 |
| 4,230,463 A | 10/1980 | Henis et al. ................ 55/16 |
| 4,705,540 A | 11/1987 | Hayes et al. ............... 55/16 |
| 4,728,345 A | 3/1988 | Murphy .................. 55/158 |
| 4,740,219 A | 4/1988 | Kulprathipanja et al. ...... 155/16 |
| 4,880,442 A | 11/1989 | Hayes et al. ............... 55/16 |
| 4,925,459 A | 5/1990 | Rojey et al. .............. 155/16 |
| 4,968,430 A | 11/1990 | Hildenbrand et al. ....... 210/640 |
| 5,085,676 A | 2/1992 | Ekiner et al. .............. 55/158 |
| 5,104,532 A | 4/1992 | Thompson et al. ......... 210/224 |
| 5,127,925 A | 7/1992 | Kulprathipanja et al. ....... 55/16 |
| 5,288,304 A | 2/1994 | Koros et al. ............... 95/45 |
| 5,431,864 A | 7/1995 | Rao et al. ................ 264/29.5 |
| 5,447,559 A | 9/1995 | Rao et al. ................. 96/4 |
| 5,507,856 A | 4/1996 | Rao et al. ................ 95/50 |

(Continued)

FOREIGN PATENT DOCUMENTS

EP     1 1188 477 A1    3/2002

(Continued)

OTHER PUBLICATIONS

McKeown et al. (Polymers of Intrinsic Microporosity (PIMs): Bridging the Void between Microporous and Polymeric Materials), Chem, Eur. J. 2005, 11, 2610-2620.*

(Continued)

*Primary Examiner*—Jason M Greene
*Assistant Examiner*—Anthony Shumate
(74) *Attorney, Agent, or Firm*—Mark Goldberg

(57) ABSTRACT

The present invention is for high performance UV-cross-linked membranes from polymers of intrinsic microporosity (PIMs) and the use of such membranes for separations. More specifically, the invention involves the methods of making UV-cross-linked membranes from PIMs. These membranes were prepared by cross-linking the UV-cross-linkable membranes from PIMs by exposure to UV-radiation. Pure gas permeation test results demonstrate that the UV-cross-linked membranes from PIMs exhibit $CO_2/CH_4$ performance well above the Robeson's polymer upper bound trade-off curve for $CO_2/CH_4$ separation. They have more than doubled selectivity for $CO_2/CH_4$ and extremely high permeability of $CO_2$ compared to the original UV-cross-linkable membranes from PIMs. These membranes also show excellent separation performance for $CO_2/N_2$, $H_2/CH_4$, $O_2/N_2$, and propylene/propane separations. These high performance UV-cross-linked membranes are very useful for gas and liquid separations such as $CO_2/CH_4$, $CO_2/N_2$, $H_2/CH_4$, $O_2/N_2$, olefin/paraffin, deep desulfurization of gasoline and diesel fuels, and ethanol/water separations.

10 Claims, 4 Drawing Sheets

U.S. PATENT DOCUMENTS

| | | | |
|---|---|---|---|
| 5,538,536 A | 7/1996 | Fuentes et al. | 95/45 |
| 6,048,388 A | 4/2000 | Schwarz | 106/31.27 |
| 6,248,682 B1 | 6/2001 | Thompson et al. | 502/4 |
| 6,500,233 B1 | 12/2002 | Miller et al. | 95/50 |
| 6,503,295 B1 | 1/2003 | Koros et al. | 95/51 |
| 6,508,860 B1 | 1/2003 | Kulkarni et al. | 95/51 |
| 6,562,110 B2 | 5/2003 | Korow et al. | 96/4 |
| 6,579,343 B2 | 6/2003 | Brennecke et al. | 95/51 |
| 6,585,802 B2 | 7/2003 | Koros et al. | 95/51 |
| 6,605,140 B2 | 8/2003 | Guiver et al. | 96/4 |
| 6,626,980 B2 | 9/2003 | Hasse et al. | 95/51 |
| 6,649,061 B2 | 11/2003 | Minhas et al. | 210/640 |
| 6,663,805 B1 | 12/2003 | Ekiner et al. | 264/45.9 |
| 6,726,744 B2 | 4/2004 | Kulprathipanja et al. | 95/45 |
| 6,740,143 B2 | 5/2004 | Corbin et al. | 96/11 |
| 6,755,900 B2 | 6/2004 | Koros et al. | 96/10 |
| 6,863,983 B2 | 3/2005 | Tsapatsis et al. | 428/446 |
| 6,896,796 B2 | 5/2005 | White et al. | 208/208 R |
| 6,932,859 B2 | 8/2005 | Koros et al. | 96/10 |
| 6,946,015 B2 | 9/2005 | Jorgensen et al. | 95/51 |
| 6,997,971 B1 | 2/2006 | Young et al. | 95/45 |
| 7,025,804 B2 | 4/2006 | Simmons et al. | 95/51 |
| 7,048,846 B2 | 5/2006 | White et al. | 208/208 R |
| 7,109,140 B2 | 9/2006 | Marand et al. | 502/4 |
| 7,138,006 B2 | 11/2006 | Miller et al. | 95/45 |
| 7,166,146 B2 | 1/2007 | Miller et al. | 95/45 |
| 2002/0053284 A1 | 5/2002 | Koros et al. | 95/51 |
| 2003/0220188 A1 | 11/2003 | Marand et al. | 502/60 |
| 2004/0107830 A1 | 6/2004 | Simmons et al. | 95/45 |
| 2004/0147796 A1 | 7/2004 | Roman et al. | 585/144 |
| 2005/0043167 A1 | 2/2005 | Miller et al. | 502/4 |
| 2005/0067323 A1 | 3/2005 | Balko | 208/208 R |
| 2005/0139066 A1 | 6/2005 | Miller et al. | 95/45 |
| 2005/0230305 A1 | 10/2005 | Kulkarni et al. | 210/500.23 |
| 2005/0268782 A1 | 12/2005 | Kulkarni et al. | 96/4 |
| 2006/0107830 A1 | 5/2006 | Miller et al. | 95/45 |
| 2006/0117949 A1 | 6/2006 | Kulkarni et al. | 95/45 |
| 2007/0022877 A1 | 2/2007 | Marand et al. | 95/51 |

FOREIGN PATENT DOCUMENTS

| | | |
|---|---|---|
| WO | WO 2005/012397 A2 | 2/2005 |
| WO | WO 2005/113121 A1 | 12/2005 |
| WO | WO 2007/007051 A1 | 1/2007 |

OTHER PUBLICATIONS

Budd et al. (Polymers of Intrinsic Microporosity (PIMs): robust, solution-processable, organic nanoporous materials), Chem. Comm., 2004, 230-231.*

Budd et al. (Solution-Processed, Organophilic Membrane Derived from a Polymer of Intrinsic Microporosity), Adv. Mater. 2004, 16, No. 5, 456-459.*

Seyhan (Organic Chemistry Structure and Reactivity) 4th Ed. 1999 pp. 14-25, 31, 34, 37, and 174-179.*

Robeson, J. Membr. Sci., 62: 165 (1991).

"Correlation of Separation Factor Versus Permeability for Polymeric Membranes" by L.M. Robeson, Journal of Membrane Science, 62 (1991) 165-185.

\* cited by examiner

UV-CROSS-LINKED MEMBRANES FROM POLYMERS OF INTRINSIC MICROPOROSITY FOR LIQUID SEPARATIONS

FIELD OF THE INVENTION

This invention pertains to high performance UV-cross-linked membranes made from polymers of intrinsic microporosity and the methods of making these membranes. This invention also pertains to the use of these UV-cross-linked membranes for liquid separations such as deep desulfurization of gasoline and diesel fuels and ethanol/water separations and for a variety of gas separations such as $CO_2/CH_4$, $CO_2/N_2$, $H_2/CH_4$, $O_2/N_2$, olefin/paraffin, iso/normal paraffins, polar molecules such as $H_2O$, $H_2S$, and $NH_3$/mixtures with $CH_4$, $N_2$, $H_2$, and other light gases separations.

BACKGROUND OF THE INVENTION

In the past 30-35 years, the state of the art of polymer membrane-based gas separation processes has evolved rapidly. Membrane-based technologies have advantages of both low capital cost and high-energy efficiency compared to conventional separation methods. Membrane gas separation is of special interest to petroleum producers and refiners, chemical companies, and industrial gas suppliers. Several applications have achieved commercial success, including carbon dioxide removal from natural gas and from biogas and enhanced oil recovery, and also in hydrogen removal from nitrogen, methane, and argon in ammonia purge gas streams. For example, UOP's Separex® cellulose acetate polymeric membrane is currently an international market leader for carbon dioxide removal from natural gas.

The membranes most commonly used in commercial gas separation applications are polymeric and nonporous. Separation is based on a solution-diffusion mechanism. This mechanism involves molecular-scale interactions of the permeating gas with the membrane polymer. The mechanism assumes that in a membrane having two opposing surfaces, each component is sorbed by the membrane at one surface, transported by a gas concentration gradient, and desorbed at the opposing surface. According to this solution-diffusion model, the membrane performance in separating a given pair of gases (e.g., $CO_2/CH_4$, $O_2/N_2$, $H_2/CH_4$) is determined by two parameters: the permeability coefficient (abbreviated hereinafter as $P_A$) and the selectivity ($\alpha_{A/B}$). The $P_A$ is the product of the gas flux and the membrane skin thickness, divided by the pressure difference across the membrane. The $\alpha_{A/B}$ is the ratio of the permeability coefficients of the two gases ($\alpha_{A/B}=P_A/P_B$) where $P_A$ is the permeability of the more permeable gas and $P_B$ is the permeability of the less permeable gas. Gases can have high permeability coefficients because of a high solubility coefficient, a high diffusion coefficient, or because both coefficients are high. In general, the diffusion coefficient decreases while the solubility coefficient increases with an increase in the molecular size of the gas. In high performance polymer membranes, both high permeability and selectivity are desirable because higher permeability decreases the size of the membrane area required to treat a given volume of gas, thereby decreasing capital cost of membrane units, and because higher selectivity results in a higher purity product gas.

Polymers provide a range of properties including low cost, permeability, mechanical stability, and ease of processability that are important for gas separation. A polymer material with a high glass-transition temperature ($T_g$), high melting point, and high crystallinity is preferred. Glassy polymers (i.e., polymers at temperatures below their $T_g$) have stiffer polymer backbones and therefore let smaller molecules such as hydrogen and helium pass through more quickly, while larger molecules such as hydrocarbons pass through more slowly as compared to polymers with less stiff backbones. However, polymers which are more permeable are generally less selective than are less permeable polymers. A general trade-off has always existed between permeability and selectivity (the so-called polymer upper bound limit). Over the past 30 years, substantial research effort has been directed to overcoming the limits imposed by this upper bound. Various polymers and techniques have been used, but without much success.

Cellulose acetate (CA) glassy polymer membranes are used extensively in gas separation. Currently, such CA membranes are used for natural gas upgrading, including the removal of carbon dioxide. Although CA membranes have many advantages, they are limited in a number of properties including selectivity, permeability, and in chemical, thermal, and mechanical stability. One of the immediate challenges that need to be addressed in CA polymer membrane is achieving higher selectivity with equal or greater permeability. Another issue is the plasticization of CA polymer that leads to swelling and to an increase in the permeability and a decrease in the selectivity of CA membrane.

High-performance polymers such as polyimides (PIs), poly(trimethylsilylpropyne) (PTMSP), and polytriazole were developed to combine high selectivity and high permeability together with high thermal stability. These polymeric membrane materials have shown promising properties for separation of gas pairs such as $CO_2/CH_4$, $O_2/N_2$, $H_2/CH_4$, and propylene/propane ($C_3H_6/C_3H_8$). However, current polymeric membrane materials have reached a limit in their productivity-selectivity trade-off relationship. In addition, gas separation processes based on the use of glassy solution-diffusion membranes frequently suffer from plasticization of the stiff polymer matrix by the sorbed penetrant molecules such as $CO_2$ or $C_3H_6$. Plasticization of the polymer as represented by the membrane structure swelling and significant increase in the permeabilities of all components in the feed occurs above the plasticization pressure when the feed gas mixture contains condensable gases.

Most recently, McKeown et al. reported the synthesis of a new type of polymer, termed polymers of intrinsic microporosity (PIMs), with a randomly contorted molecular structure, bridging the void between microporous and polymeric materials. The rotational freedom of these PIM materials has been removed from the polymer backbone. These polymers exhibit properties analogous to those of conventional microporous materials including large and accessible surface areas, interconnected micropores of less than 2 nm in size, as well as high chemical and thermal stability, but, in addition, possess some favorable properties of conventional polymers including good solubility and easy processability for the preparation of polymeric membranes. Polymeric membranes have been prepared directly from some of these PIMs and both the liquid and gas separation performances have been evaluated. Membranes from PIMs have shown exceptional properties (e.g. extremely high gas permeability) for separation of commercially important gas pairs, including $O_2/N_2$ and $CO_2/CH_4$. The exceptionally high permeability of gases arises from the rigid but contorted molecular structures of PIMs, frustrating packing and creating free volume, coupled with chemical functionality giving strong intermolecular interactions. Two published PCT patent applications provide further detail: WO 2005/012397 A2 and WO 2005/113121 A1, both applications incorporated by reference in their entireties. Membranes from PIMs, however, have much lower selectivities for commercially important gas pairs, such as $O_2/N_2$ and $CO_2/CH_4$, although their gas permeabilities are significantly higher than those of commercial polymeric membranes from glassy polymers such as CA, polyimides, and polyetherimides.

The present invention involves a UV-cross-linking method to further improve the separation performance of membranes containing PIMs, particularly the selectivities for separation of gas pairs such as $O_2/N_2$ and $CO_2/CH_4$ through the formation of interpolymer-chain-connected cross-linked networks.

Environmental concerns have led to the decreases in the permissible levels of sulfur in hydrocarbon fuels. Sulfur in refinery streams, e.g., feedstocks, is present in a number of different forms, including aliphatic and aromatic compounds. Sulfur, however, tends to be concentrated in the higher boiling fractions, mainly in the form of aromatic heterocycle compounds such as benzothiophenes and dibenzothiophenes. Sulfur compounds in the gasoline and diesel fuels are converted to SOx during combustion, which not only results in acid rain, but also poisons catalysts in catalytic converters for reducing CO and NOx.

Currently, deep desulfurization of gasoline and diesel fuels is attracting wide interest because of the increasingly stringent environmental regulations on sulfur concentration in gasoline and diesel fuels. The sulfur level in diesel fuels must be reduced to 15 wppm (0.0015% by weight) by 2006 in the United States, and to 10 wppm by 2010 in the European Union. The sulfur level in gasoline must be reduced to 30 wppm by 2006. Further, lower sulfur limits are expected for highway diesel fuels and also for non-road diesel fuels in the near future. Diesel fuel is considered to be one of the promising liquid hydrocarbon fuels for producing $H_2$ for use in automotive and portable fuel cells due to its high energy density. However, the sulfur compounds in the fuel and $H_2S$ produced from them by the hydrocarbon reforming process are poisons to reforming and shift catalysts as well as the electrode catalysts. Thus, sulfur concentrations in the fuel needs to be reduced to less than 1 wppm for proton exchange membrane fuel cell and less than 10 wppm for solid oxide fuel cell.

Refiners have employed catalytic hydrodesulphurization processes to reduce sulfur in gasoline and diesel fuels. Substantial advances have been achieved in new catalyst developments and new reactor technologies along with improved processes for producing low-sulfur gasoline and diesel fuels. However, severe operating conditions (e.g. high temperature, high pressure and high hydrogen consumption) are required for hydrodesulphurization to achieve ultra-deep desulphurization of gasoline and diesel fuels. The production of ultra low sulfur gasoline and diesel at a sustainable cost, and available in quantities that will meet the demands of U.S. drivers, is tentatively the single most significant and costly challenge faced by the refining industry. Therefore, new, more cost efficient technologies such as membrane separation (see U.S. Pat. No. 6,896,796 B2 and US 2005/0067323 A1), adsorption, extraction, oxidation, and bioprocesses need to be developed rapidly to provide alternatives to refiners in the 2006-2010 timeframe.

Membrane separation technology provides a new viable efficient approach for the separation of organic mixtures in the petrochemical field. Desulphurization of gasoline and diesel fuels by pervaporation membrane process is a newly emerged technology. Pervaporation is a process that separates mixtures of liquids by partial vaporization through a non-porous membrane. The membrane acts as a sulfur selective barrier between two phases, the liquid phase feed and the vapor phase permeate. A pervaporation process involves contacting a gasoline or diesel fuel feed with a membrane having sufficient flux and selectivity to separate a sulfur deficient retentate fraction from a sulfur enriched permeate fraction. Sulfur deficient retentate fractions are useful and can be added directly into the gasoline or diesel pool, as appropriate. Sulfur enriched permeate fractions need further treatment by conventional processes. Compared to traditional sulfur removal processes such as a hydrodesulfurization process, a pervaporation membrane process offers a number of potential advantages, including high selectivity (separation efficiency), lower energy consumption, lower operating costs, and simple operation.

However, there have been only a few reports of the selective permeation of sulfur-containing compounds using a membrane separation process most recently. See US 2005/0067323 A1; U.S. Pat. No. 6,896,796 B2 and U.S. Pat. No. 6,649,061 B2.

In 2004, W. R. Grace & Co.'s Davison Membranes initiated a joint marketing effort with CB&I for Davison Membranes' S-Brane™ membrane-based gasoline desulfurization process. S-Brane™ is a pervaporation process using polyimide polymer membrane that selectively removes sulfur-containing molecules from fluid catalytic cracking (FCC) and other naphtha hydrocarbon streams. This S-Brane™ membrane separation process, however, has not been commercialized up to now mainly due to the level of sulfur selectivity that would require the sulfur to be removed with a high stage cut. Therefore, the naphtha recovery in the retentate is low, leading to high octane loss.

Thus, the development of advanced materials for the preparation of new generations of pervaporation membranes with improved sulfur selectivity and high permeability for deep desulfurization of gasoline and diesel fuels is still critically required.

One objective of the present invention is to design and develop a new generation of low cost and high performance UV-cross-linked polymer membranes that are capable of reducing the sulfur content of gasoline to <30 wppm and diesel fuels to <10 wppm with less octane loss than the current state-of-the-art desulfurization polymer membranes. The resulting technology also provides platforms for other pervaporation membrane processes such as for bioethanol recovery from the fermentation products in the biomass conversion to bioethanol process.

SUMMARY OF THE INVENTION

The present invention is for novel high performance UV-cross-linked membranes from PIMs. More specifically, the invention involves the method of making the UV-cross-linked membranes from PIMs and the use of such membranes for separations.

The UV-cross-linked PIM membranes possessing high selectivities were prepared by cross-linking the UV-cross-linkable membranes from PIMs by exposure to UV-radiation. The PIM membrane materials have a rigid rod-like, randomly contorted structure which allows them to exhibit intrinsic microporosity. These PIMs exhibit properties analogous to those of conventional microporous materials including large and accessible surface areas, interconnected micropores of less than 2 nm in size, as well as high chemical and thermal stability, but, in addition, possess properties of conventional polymer membrane materials including good solubility and easy processability. The UV-cross-linkable membranes from PIMs have excellent properties (e.g. extremely high gas permeability) for separation of gas pairs such as $O_2/N_2$ and $CO_2/CH_4$ due to the rigid contorted molecular structures of PIMs. The UV-cross-linked membranes from UV-cross-linkable PIMs exhibit exceptional properties for $CO_2/CH_4$ and $O_2/N_2$ separations with performance well above the polymer upper bound trade-off curves (see Robeson, J. MEMBR. SCI., 62: 165 (1991)) for $CO_2/CH_4$ and $O_2/N_2$ separations, respectively, more than doubled selectivities for $CO_2/CH_4$ and $O_2/N_2$, and still extremely high permeabilities of $CO_2$ and $O_2$ compared to the UV-cross-linkable membranes from PIMs.

The membranes prepared in accordance with the present invention are highly promising not only for gas separations such as $CO_2/CH_4$, $CO_2/N_2$, $H_2/CH_4$, $O_2/N_2$, olefin/paraffin (e.g. propylene/propane separation), and iso/normal paraffins separations, but also for liquid separations such as deep desulfurization of gasoline and diesel fuels and ethanol/water separations.

DETAILED DESCRIPTION OF THE INVENTION

Figure 1:
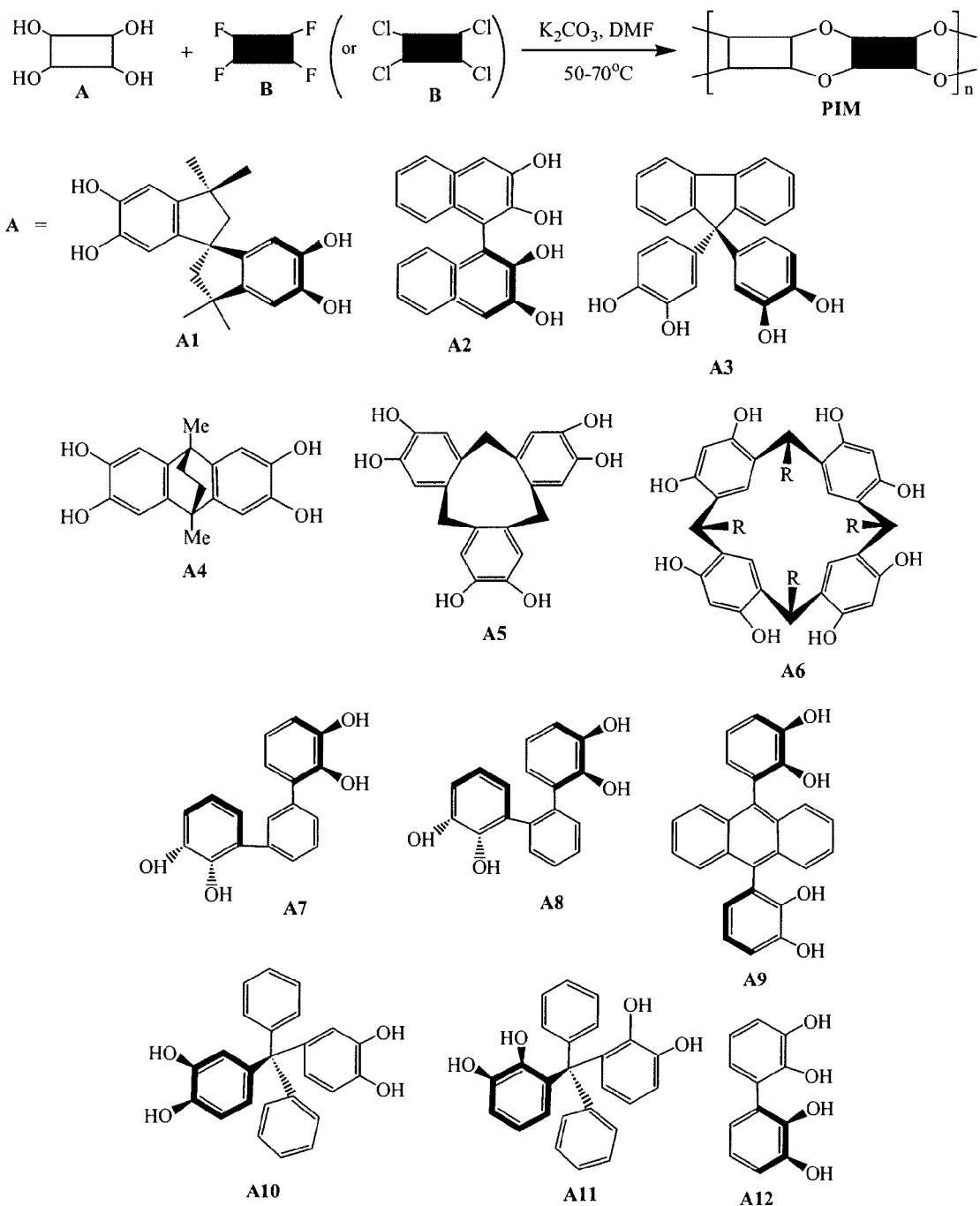
FIG. 1 shows structures and preparation of UV-crosslinkable PIMs.

Current polymeric membrane materials have reached a limit in their productivity-selectivity trade-off relationship for separations. In addition, gas separation processes based on glassy solution-diffusion membranes frequently suffer from plasticization of the stiff polymer matrix by the sorbed penetrant molecules such as $CO_2$ or $C_3H_6$. Plasticization of the polymer represented by swelling of the membrane structure and significant increase in the permeability of all components in the feed occurs above the plasticization pressure when the feed gas mixture contains condensable gases.

Methods for stabilizing the polymeric membranes include either annealing or cross-linking. Polymeric membrane cross-linking methods include thermal treatment, chemical cross-linking, UV-photochemical cross-linking, and blending with other polymers.

This invention pertains to high performance UV-cross-linked membranes from polymers of intrinsic microporosity (PIMs) and methods of making them. This invention also pertains to the application of these UV-cross-linked membranes from PIMs for liquid separations such as pervaporations and a variety of gas separations such as $CO_2/CH_4$, $CO_2/N_2$, $H_2/CH_4$, $O_2/N_2$, olefin/paraffin, iso/normal paraffins, polar to molecules such as $H_2O$, $H_2S$, and $NH_3$/mixtures with $CH_4$, $N_2$, $H_2$, and other light gas separations.

The UV-cross-linked membranes from PIMs of the present invention are especially useful in the purification, separation or adsorption of a particular species in the liquid or gas phase. In addition to separation of pairs of gases, these membranes may, for example, be used for the separation of proteins or other thermally unstable compounds, e.g. in the pharmaceutical and biotechnology industries. The membranes may also be used in fermenters and bioreactors to transport gases into the reaction vessel and to transfer cell culture medium out of the vessel. Additionally, the membranes may be used for the removal of microorganisms from air or water streams, water purification, ethanol production in a continuous fermentation/membrane pervaporation system, and in detection or removal of trace compounds or metal salts in air or water streams.

These UV-cross-linked membranes from PIMs may also be used in the separation of liquid mixtures by pervaporation, such as in the removal of organic compounds (e.g., alcohols, phenols, chlorinated hydrocarbons, pyridines, ketones) from water such as aqueous effluents or process fluids. A membrane which is ethanol-selective would be used to increase the ethanol concentration in relatively dilute ethanol solutions (5-10% ethanol) obtained by fermentation processes. Another liquid phase separation example using these UV-cross-linked PIM membranes is the deep desulfurization of gasoline and diesel fuels by a pervaporation membrane process similar to the process described in U.S. Pat. No. 7,048,846 B2, incorporated by reference herein in its entirety. The UV-cross-linked membranes from PIMs that are selective to sulfur-containing molecules would be used to selectively remove sulfur-containing molecules from fluid catalytic cracking (FCC) and other naphtha hydrocarbon streams. Further liquid phase examples include the separation of one organic component from another organic component, e.g. to separate isomers of organic compounds. Mixtures of organic compounds which may be separated using membranes made in accordance with the present invention include: ethylacetate-ethanol, diethylether-ethanol, acetic acid-ethanol, benzene-ethanol, chloroform-ethanol, chloroform-methanol, acetone-isopropylether, allylalcohol-allylether, allylalcohol-cyclohexane, butanol-butylacetate, butanol-1-butylether, ethanol-ethylbutylether, propylacetate-propanol, isopropylether-isopropanol, methanol-ethanol-isopropanol, and ethylacetate-ethanol-acetic acid.

The UV-cross-linked membranes from PIMs of the present invention are especially useful in gas separation processes in air purification, petrochemical, refinery, natural gas industries. Examples of such separations include separation of volatile organic compounds (such as toluene, xylene, and acetone) from an atmospheric gas, such as nitrogen or oxygen and nitrogen recovery from air. Further examples of such separations are for the separation of $CO_2$ from natural gas, $H_2$ from $N_2$, $CH_4$, and Ar in ammonia purge gas streams, $H_2$ recovery in refineries, olefin/paraffin separations such as propylene/propane separation, and iso/normal paraffin separations. Any given pair or group of gases that differ in molecular size, for example nitrogen and oxygen, carbon dioxide and methane, hydrogen and methane or carbon monoxide, helium and methane, can be separated using the UV-cross-linked membranes from PIMs described herein. More than two gases can be removed from a third gas. For example, some of the gas components which can be selectively removed from a raw natural gas using the membranes described herein include carbon dioxide, oxygen, nitrogen, water vapor, hydrogen sulfide, helium, and other trace gases. Some of the gas components that can be selectively retained include hydrocarbon gases.

The UV-cross-linked membranes from PIMs of the present invention may be used for separation of organic molecules from water (e.g. ethanol and/or phenol from water by pervaporation) and removal of metal (e.g., mercury(II) ion and radioactive cesium(I) ion) and other organic compounds (e.g., benzene and atrazene) from water.

An additional application for the UV-cross-linked membranes from PIMs is in chemical reactors to enhance the yield of equilibrium-limited reactions by selective removal of a specific product in an analogous fashion to the use of hydrophilic membranes to enhance esterification yield by the removal of water.

The UV-cross-linked membranes from PIMs were prepared by cross-linking the UV-cross-linkable membranes from PIMs by exposure to UV-radiation. PIMs (or as so-called "organic microporous polymer materials") described herein are polymeric materials that possess microporosity that is intrinsic to their molecular structures. The PIM membrane materials have a rigid rod-like, randomly contorted structure which allows them to exhibit intrinsic microporosity. These PIMs exhibit properties analogous to those of conventional microporous materials including large and accessible surface areas, interconnected micropores of less than 2 nm in size, as well as high chemical and thermal stability, but, in addition, possess properties of conventional polymer membrane materials including good solubility and easy processability. The UV-cross-linkable membranes from PIMs have excellent properties (e.g. extremely high gas permeability) for separation of gas pairs such as $O_2/N_2$ and $CO_2/CH_4$ due to the rigid but contorted molecular structures of PIMs. These membranes, however, have much lower selectivities for commercially important gas pairs, such as $O_2/N_2$ and $CO_2/CH_4$, although their gas permeabilities are significantly higher than those of commercial polymeric membranes from glassy polymers such as CA, polyimides, and polyetherimides. The UV-cross-linked membranes from PIMs are expected to further improve the separation performance of membranes from PIMs particularly the selectivity for separation of gas pairs such as $O_2/N_2$ and $CO_2/CH_4$ through the formation of inter-polymer-chain-connected cross-linked networks.

The membranes of the present invention can be fabricated into any convenient form such as sheets, tubes or hollow fibers. These membranes can also be fabricated into thin film composite membranes incorporating a selective thin layer comprising a UV-cross-linked PIM material and a porous supporting layer comprising a different polymer material.

The design of successful UV-cross-linked membranes from PIMs described herein is based on the proper selection of the UV-cross-linkable PIM membrane materials. The UV-cross-linkable PIM membrane materials provide a wide range of properties important for membrane separations such as low cost, easy processability, high permeability, and should be selected from PIM polymer materials which can form cross-linked structure by exposure to UV radiation to further improve membrane selectivity.

Figure 2:
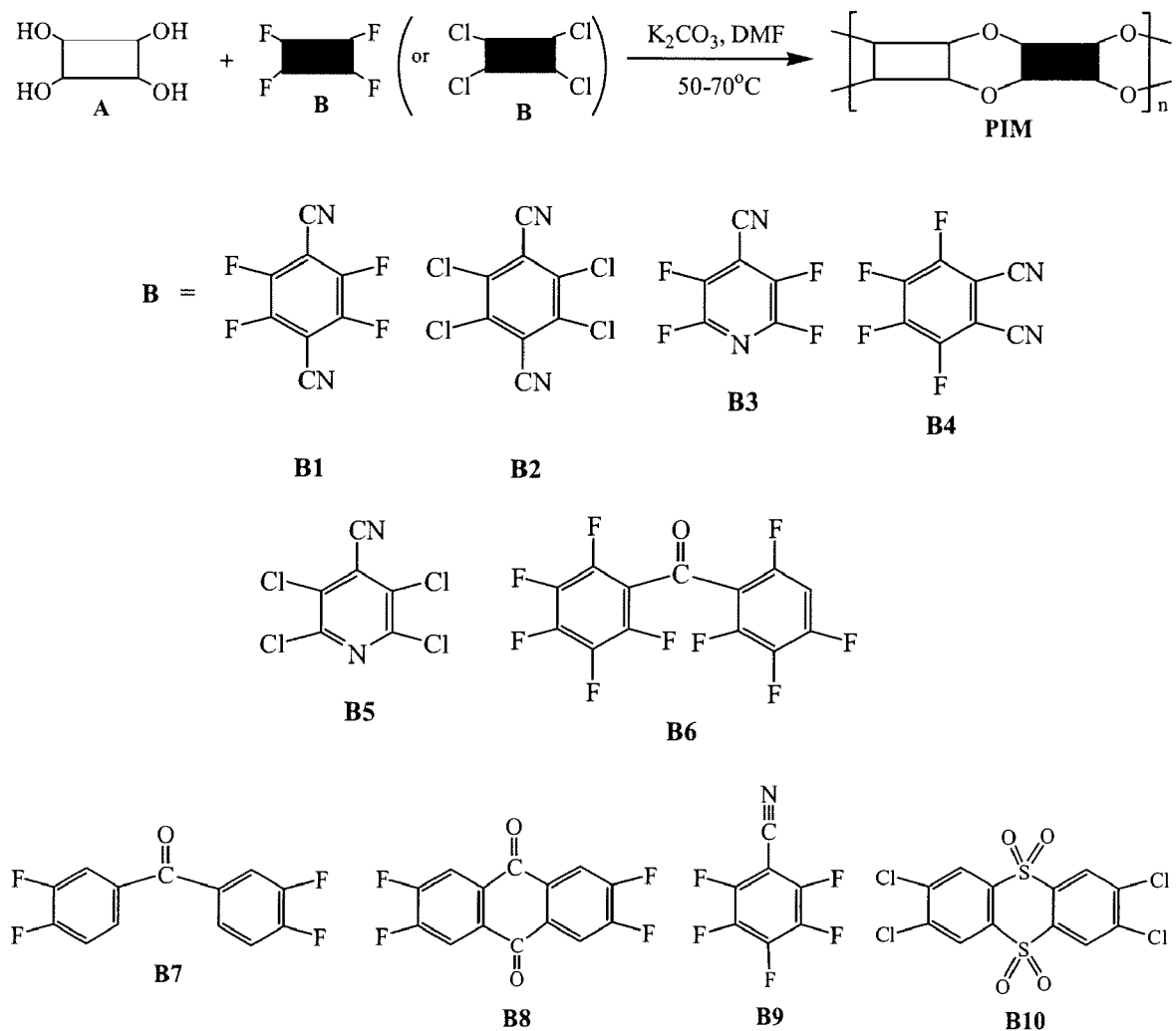
FIG. 2 shows further structures for use in preparation of UV-crosslinkable PIMs.

The UV-cross-linkable PIMs suitable for the preparation of UV-cross-linked PIM membranes comprise polymer chain segments wherein at least a part of these polymer chain segments are UV-cross-linked to each other through direct covalent bonds by exposure to UV radiation. The UV-cross-linkable PIMs can be selected from any PIMs containing a UV-cross-linkable nitrile (—C≡N), benzophenone (—$C_6H_4$—C(=O)—$C_6H_4$—), acrylic ($CH_2$=C(COOH)— or —CH=C(COOH)—), vinyl ($CH_2$=CH—), styrenic ($C_6H_5$—CH=CH— or —$C_6H_4$—CH=$CH_2$), styrenic-acrylic, aryl sulfonyl (—$C_6H_4$—$SO_2$—$C_6H_4$—), 3,4-epoxycyclohexyl, and 2,3-dihydrofuran groups or mixtures of these groups. The structures of some representative UV-cross-linkable PIMs and their preparation are indicated in FIGS. 1 and 2. For these UV-cross-linkable PIMs as shown in FIG. 2, there are UV-cross-linkable nitrile (C≡N), benzophenone (—$C_6H_4$—C(=O)—$C_6H_4$—), or aryl sulfonyl (—$C_6H_4$—$SO_2$—$C_6H_4$—) groups and there are no single bonds in the backbone around which rotation can occur. The dioxane formation (i.e., a double aromatic nucleophilic substitution) offers a general reaction for the preparation of UV-cross-linkable PIMs from appropriate hydroxylated aromatic monomers (e.g., A1-A12) as shown in FIG. 1 and fluorinated (or chlorinated) aromatic monomers (e.g., B1-B10) as shown in FIG. 2. The general reaction of these hydroxylated aromatic monomers A with the fluorinated (or chlorinated) aromatic monomers B to produce these PIMs is shown in the top line of FIG. 1 and FIG. 2. These UV-cross-linkable PIMs to be used as membrane materials for the preparation of UV-cross-linked membranes invention may be prepared according to the literature procedure. The synthesis of UV-cross-linkable PIMs is well established in the literature.

Figure 3:
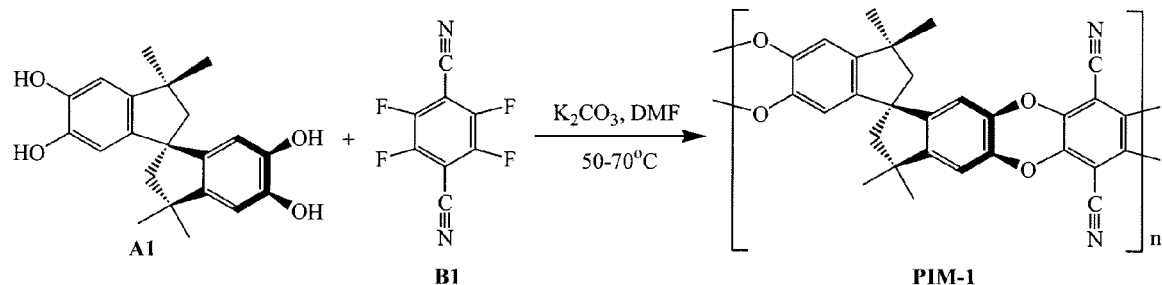
FIG. 3 shows the chemical equation for synthesis of UV-cross-linkable PIM-1.

For example, for the synthesis of UV-cross-linkable PIM-1 containing UV-cross-linkable nitrile groups from monomers 3,3,3',3'-tetramethyl-1,1''-spirobisindane-5,5',6,6'-tetrol (A1) and 2,3,5,6-tetrafluoroterephthalonitrile (B1) as shown in FIG. 3, an efficient dibenzodioxane-forming reaction (i.e. aromatic nucleophilic substitution) between the aromatic tetrol monomer A1 with the appropriate fluorine-containing compound B1 gave soluble PIM-1 with a high yield. PIM-1 is freely soluble in organic solvents such as methylene chloride, THF, and DMAc. PIM-1 was purified by repeated precipitation from THF solution into methanol and when collected by filtration gave a fluorescent yellow free-flowing powder.

The UV-cross-linkable polymer membranes from PIMs (e.g. PIM-1 membrane from PIM-1 polymer) were fabricated as follows. The UV-cross-linkable polymer membranes from PIMs were prepared by casting a homogeneous PIM solution (2-5 wt-%) into a glass ring on top of a clean glass plate and allowing the solvent to evaporate slowly inside a plastic cover for at least 12 hours at room temperature. The membranes were detached from the glass plate and dried at room temperature for 24 hours and then at 110° C. for at least 48 hours under vacuum. The membranes were transparent, around 20-100 μm thick and were cut into small circles for pure gas permeation measurements. The solvents that can be used for dissolving PIMs include methylene chloride, THF, acetone, DMF, NMP, DMSO, and others known to those skilled in the art.

The UV-cross-linkable polymer membranes from PIMs can also be fabricated by a method comprising the steps of: dissolving the UV-cross-linkable PIM polymer in a solvent to form a solution of the PIM material; contacting a porous membrane support (e.g., a support made from polyacrylonitrile with a $N_2$-permeance of 150 $m^3/m^2$.h.bar, which should exceed the expected gas permeance of the selective PIM layer by at least 10 times) with said solution; and evaporating the solvent to provide a thin selective layer comprising the UV-cross-linkable PIM polymer material on the supporting layer.

The UV-cross-linked polymer membranes from PIMs were prepared by further UV-cross-linking the UV-cross-linkable PIM membranes containing UV-cross-linkable groups using a UV lamp from a certain distance and for a period of time selected based upon the separation properties sought. For example, UV-cross-linked PIM-1 membranes can be prepared from PIM-1 membrane by exposure to UV radiation using 254 nm wavelength UV light generated from a UV lamp with 1.9 cm (0.75 inch) distance from the membrane surface to the UV lamp and a radiation time of 30 min at less than 50° C. The UV lamp described here is a low pressure, mercury arc immersion UV quartz 12 watt lamp with 12 watt power supply from Ace Glass Incorporated. Optimization of the cross-linking degree in the UV-cross-linked polymer membranes from PIMs should promote the tailoring of membranes for a wide range of gas and liquid separations with improved permeation properties and environmental stability. The cross-linking degree of the UV-cross-linked polymer membranes from PIMs can be controlled by adjusting the distance between the UV lamp and the membrane surface, UV radiation time, wavelength and strength of UV light, etc. Preferably, the distance from the UV lamp to the membrane surface is in the range of 0.8 to 25.4 cm (0.3 to 10 inches) with a UV light provided from 12 watt to 450 watt low pressure or medium pressure mercury arc lamp, and the UV radiation time is in the range of 1 min to 1 h. More preferably, the distance from the UV lamp to the membrane surface is in the range of 1.3 to 5.1 cm (0.5 to 2 inches) with a UV light provided from 12 watt to 450 watt low pressure or medium pressure mercury arc lamp, and the UV radiation time is in the range of 1 to 40 minutes.

The permeability coefficient ($P_A$) and selectivity ($\alpha_{A/B}$) of the UV-cross-linkable PIM membranes and the UV-cross-linked PIM membranes were measured by pure gas measurements at 50° C. under about 690 kPa (100 psig) pressure. The pure gas measurements were conducted by a time-lag method. This method measures pressure increases in a constant downstream volume as a function of time to determine the permeability. Each test was performed after the whole unit was degassed to a pressure of 1-10 mTorr and the system reached thermal equilibrium.

For example, the permeability and selectivity of the UV-cross-linkable PIM-1 (see FIG. 3) membrane and the UV-cross-linked PIM-1 membrane for $CO_2/CH_4$ separation were measured by pure gas measurements at 50° C. under about 690 kPa (100 psig) pressure. Gas permeation data for $CO_2/CH_4$ separation are presented in Table 1 and FIG. 4 for membranes formed from PIM-1 and UV-cross-linked PIM-1 by exposure to UV radiation for 20 min and 30 min, respectively, denoted PIM-1, PIM-1-UV-20 min, and PIM-1-UV-30 min, respectively. Both PIM-1-UV-20 min and PIM-1-UV-30 min membranes contain PIM-1 polymer chain segments cross-linked to each other through direct covalent bonds.

TABLE 1

Pure Gas Permeation Test Results of PIM-1 and UV-Cross-Linked PIM-1 Membranes for $CO_2/CH_4$ Separation*

| Membrane | $P_{CO2}$ (barrer) | $P_{CH4}$ (barrer) | $\alpha_{CO2/CH4}$ | $\Delta\alpha_{CO2/CH4}$ |
|---|---|---|---|---|
| CA | 8.28 | 0.362 | 22.8 | — |
| Matrimid | 10.0 | 0.355 | 28.2 | — |
| Ultem | 1.95 | 0.0644 | 30.3 | — |
| PIM-1 | 4791.8 | 589.6 | 8.1 | 0 |
| PIM-1-UV-20 min | 1204.9 | 55.0 | 21.9 | 169% |
| PIM-1-UV-30 min | 635.7 | 21.3 | 29.8 | 267% |

*$P_{CO2}$ and $P_{CH4}$ were tested at 50° C. and 690 kPa (100 psig); 1 barrer = $10^{-10}$ cm$^3$(STP) · cm/cm$^2$ · sec · cmHg.

Figure 4:
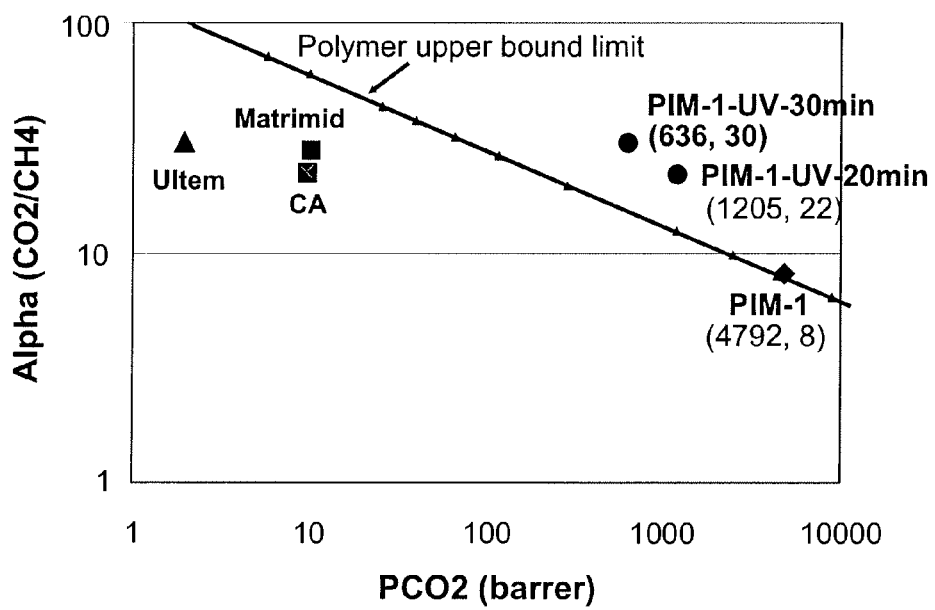
FIG. 4 is a graph of the performance of UV-cross-linked PIM-1 membranes and several other polymer membranes for $CO_2/CH_4$ separation.

FIG. 4 shows the $CO_2/CH_4$ separation performance of PIM-1 and UV-cross-linked PIM-1 membranes ($CO_2/CH_4$ separation experimental "polymer upper bound limit" data were from literature and were measured at 35° C. and about 345 kPa (50 psig) (see Robeson, J. MEMBR. SCI., 62: 165 (1991)); $CO_2/CH_4$ separation experimental data of the present work were measured at 50° C. and 690 kPa (100 psig).

It can be seen from Table 1 and FIG. 4 that PIM-1 membrane is highly permeable for $CO_2$ ($P_{CO2}$ higher than 4700 barrers), but its selectivity for $CO_2/CH_4$ ($\alpha_{CO2/CH4}$=8.1) is much lower than those of commercial polymeric membranes from glassy polymers such as cellulose acetate (CA, $\alpha_{CO2/CH4}$=about 22), Matrimid polyimide ($\alpha_{CO2/CH4}$=about 28), and Ultem polyetherimide ($\alpha_{CO2/CH4}$=about 30). However, after the PIM-1 membrane was cross-linked by exposure to UV radiation for 20 min, the resulting cross-linked PIM-1-UV-20 min membrane shows about 170% increase in $\alpha_{CO2/CH4}$ compared to PIM-1 membrane. The PIM-1-UV-20 min membrane has $\alpha_{CO2/CH4}$ (=21.9) similar to that of CA membrane and in the meantime the $P_{CO2}$ is more than 100 times higher than that of CA membrane. Most importantly, it has been demonstrated that the cross-linking degree of PIM-1 membrane can be controlled by adjusting the UV radiation time. As shown in Table 1, after the PIM-1-UV-20 min membrane was further cross-linked by exposure to UV radiation for another 10 min, the resulting PIM-1-UV-30 min membrane exhibits more than 250% increase in $\alpha_{CO2/CH4}$ compared to PIM-1 membrane. In addition, the PIM-1-UV-30 min membrane has $\alpha_{CO2/CH4}$ (=29.8) similar to those of Matrimid and Ultem membranes and in the meantime the $P_{CO2}$ is significantly higher than those of Matrimid and Ultem membranes.

FIG. 4 also shows Robeson's 1991 polymer upper bound for $CO_2/CH_4$ separation. The selectivity for $CO_2/CH_4$ of PIM-1 membrane reaches Robeson's 1991 polymer upper bound. Compared to PIM-1 membrane, both UV-cross-linked PIM-1-UV-20 min and PIM-1-UV-30 min membranes exhibit greatly enhanced selectivity for $CO_2/CH_4$, which are significantly higher than Robeson's 1991 polymer upper bound. This indicates that UV-cross-linked PIM-1-UV-20 min and PIM-1-UV-30 min membranes are very promising membrane candidates for applications such as for the removal of $CO_2$ from natural gas or from flue gas. The improved performance of UV-cross-linked PIM-1-UV-20 min and PIM-1-UV-30 min membranes over Robeson's 1991 polymer upper bound is attributed to the formation of interpolymer-chain-connected cross-linked networks by exposure to UV radiation.

Pure gas permeation test results as shown in Tables 2, 3 and 4 indicate that the UV-cross-linked PIM-1-UV-30 min membrane also has very good performance for $H_2/CH_4$, $CO_2/N_2$, and propylene/propane separations. The PIM-1-UV-30 min membrane has both high $H_2$ permeability (1882.9 barrers) and high $H_2/CH_4$ selectivity ($\alpha_{H2/CH4}$=88.4) for $H_2/CH_4$ separation (Table 2). As shown in Table 3, the PIM-1-UV-30 min membrane also has high $CO_2$ permeability (635.7 barrers) and high $CO_2/N_2$ selectivity ($\alpha_{CO2/N2}$=22.2) for flue gas ($CO_2/N_2$) separation. In addition, as shown in Table 4, the PIM-1-UV-30 min membrane also exhibits extremely high propylene permeability (65.1 barrers) and reasonably good propylene/propane selectivity ($\alpha_{propylene/propane}$=2.26) for propylene/propane and other olefin/paraffin separations.

TABLE 2

Pure Gas Permeation Test Results of UV-Cross-Linked PIM-1 Membrane for $H_2/CH_4$ Separation*

| Membrane | $P_{H2}$ (barrer) | $P_{CH4}$ (barrer) | $\alpha_{H2/CH4}$ | $\Delta\alpha_{H2/CH4}$ |
|---|---|---|---|---|
| PIM-1 | 2594.2 | 589.6 | 4.40 | 0 |
| PIM-1-UV-30 min | 1882.9 | 21.3 | 88.4 | 1909% |

*$P_{H2}$ and $P_{CH4}$ were tested at 50° C. and 690 kPa (100 psig); 1 barrer = $10^{-10}$ cm$^3$(STP) · cm/cm$^2$ · sec · cmHg.

TABLE 3

Pure Gas Permeation Test Results of UV-Cross-Linked PIM-1 Membrane for $CO_2/N_2$ Separation*

| Membrane | $P_{CO2}$ (barrer) | $P_{N2}$ (barrer) | $\alpha_{CO2/N2}$ |
|---|---|---|---|
| PIM-1-UV-30 min | 635.7 | 28.6 | 22.2 |

*$P_{CO2}$ and $P_{N2}$ were tested at 50° C. and 690 kPa (100 psig); 1 barrer = $10^{-10}$ cm$^3$(STP) · cm/cm$^2$ · sec · cmHg.

TABLE 4

Pure Gas Permeation Test Results of UV-Cross-Linked
PIM-1 Membrane for Propylene/Propane Separation*

| Membrane | $P_{propylene}$ (barrer) | $P_{propane}$ (barrer) | $\alpha_{propylene/propane}$ |
|---|---|---|---|
| PIM-1-UV-30 min | 65.1 | 28.8 | 2.26 |

*$P_{propylene}$ and $P_{propane}$ were tested at 50° C. and 690 kPa (100 psig); 1 barrer = $10^{-10}$ cm$^3$(STP) · cm/cm$^2$ · sec · cmHg.

TABLE 5

Mixed Gas Permeation Test Results of UV-Cross-Linked
PIM-1 Membrane for $O_2/N_2$ Separation*

| Film | $P_{air}$ (barrer) | $P_{O_2}{}^c$ (barrer) | $\alpha_{O2/N2}$ |
|---|---|---|---|
| PIM-1-UV-30 min$^a$ | 47.2 | 146.6 | 5.40 |
| PIM-1-UV-30 min$^b$ | 39.3 | 124.4 | 5.62 |

*1 barrer = $10^{-10}$ cm$^3$(STP) · cm/cm$^2$ · sec · cmHg.
$^a$Tested at 50° C. under 690 kPa (100 psig) air pressure.
$^b$Tested at 35° C. under 690 kPa (100 psig) air pressure.
$^c$Calculated from GC results and permeation results.
$^d$Composition of ultra zero certified air used as feed gas for air separation study: O$_2$: 16.831%, N$_2$: 83.067%.

The UV-cross-linked PIM-1-UV-30 min membrane also has excellent $O_2/N_2$ separation performance. The air permeabilities of these membranes were measured by using ultra zero certified air as the feed gas at 35° C. or 50° C. under about 690 kPa (100 psig) feed pressure. The $O_2$ permeability and $O_2/N_2$ selectivity were calculated from air permeation data and GC results for the feed and permeate gas compositions.

The results (Table 5) show that both high air permeability (146.6 barrers) and high $O_2/N_2$ selectivity (5.40) can be achieved at 50° C. and under 690 kPa (100 psig) feed pressure by using the UV-cross-linked PIM-1-UV-30 min membrane. When tested at 35° C. and under 690 kPa (100 psig) feed pressure, the UV-cross-linked PIM-1-UV-30 min membrane exhibits even higher $O_2/N_2$ selectivity (5.62).

Figure 5:
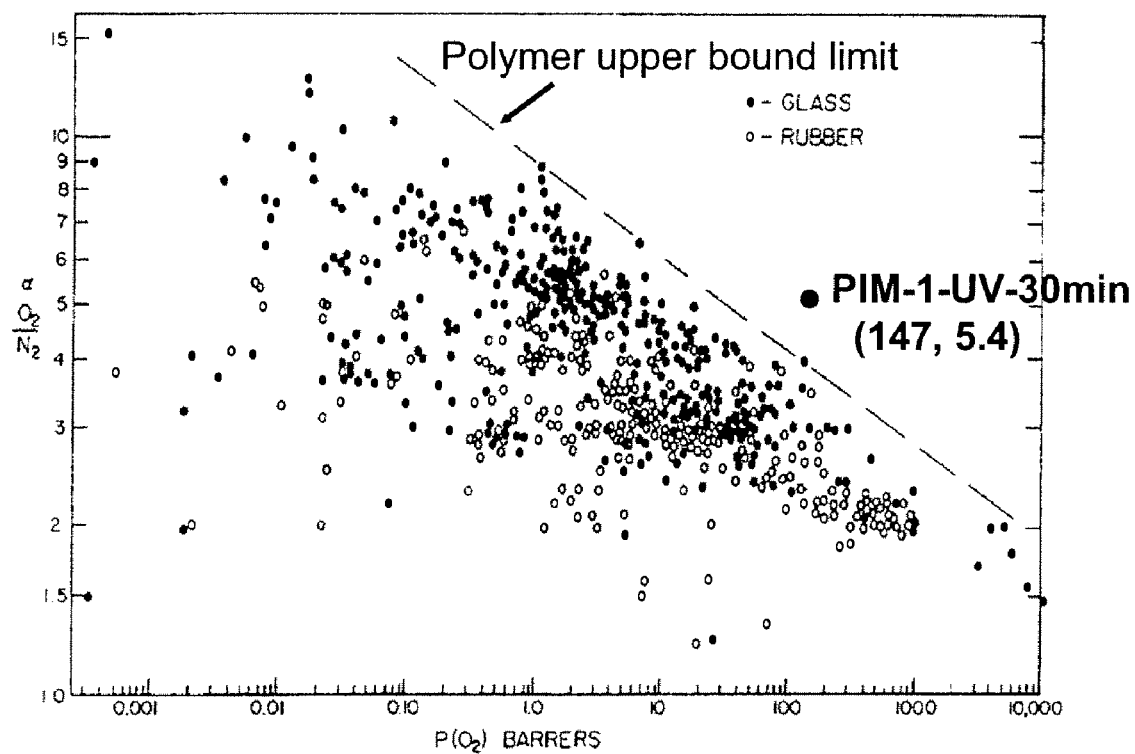
FIG. 5 illustrates the performance of the UV-cross-linked PIM-1-UV-30 min membrane for $O_2/N_2$ separation.

FIG. 5 shows Robeson's 1991 polymer upper bound limit for $O_2/N_2$ separation and the $O_2/N_2$ separation performance of UV-cross-linked PIM-1-UV-30 min membrane. The separation performance of the UV-cross-linked PIM-1-UV-30 min membrane far exceeded Robeson's 1991 polymer upper bound limit for $O_2/N_2$ separation. $O_2/N_2$ separation experimental data and polymer upper bound data (black dots) in FIG. 5 were from literature and were measured at 35° C. and about 690 kPa (100 psig) (see Robeson, J. Membr. Sci, 62: 165 (1991)).

This new type of UV-cross-linked PIM membranes is also very promising for $O_2/N_2$ separation for the production of $O_2$ due to their extremely high permeability and high selectivity. In summary, the UV-cross-linked membranes from PIMs described in this invention can be used for a variety of liquid and gas separations such as deep desulfurization of gasoline and diesel fuels, alcohol/water, $CO_2/CH_4$, $H_2/CH_4$, $O_2/N_2$, $CO_2/N_2$, olefin/paraffin, iso/normal paraffins, polar molecules such as $H_2O$, $H_2S$, and $NH_3$/mixtures with $CH_4$, $N_2$, $H_2$, and other light gases separations. The UV-cross-linked membranes from PIMs of the present invention are especially useful in gas separation processes in air separation, petrochemical, refinery, and natural gas industries. Examples of such separations include separation of $O_2$ from $N_2$, $CO_2$ from natural gas ($CH_4$) or from flue gas ($N_2$), $H_2$ from $N_2$, $CH_4$, and Ar in ammonia purge gas streams, $H_2$ recovery in refineries, olefin/paraffin separations such as propylene/propane separation, and iso/normal paraffin separations. The crosslinked polymers can also be used as thin films for fuel cell applications, filters for filtrations and water purifications, binders for catalyst or adsorbent preparation, and substrates for drug delivery.

What is claimed is:

1. A process for separating at least one liquid from a mixture of liquids, the process comprising:

a) providing a membrane comprising a microporous material comprising organic macromolecules comprised of a generally planar species connected by rigid linkers having a point of contortion such that two adjacent of said generally planar species connected by said rigid linkers are held in non-coplanar orientation wherein said organic macromolecules have further been cross-linked by exposure to ultraviolet radiation;

b) contacting the mixture of liquids, wherein said mixture of liquids comprises sulfur containing compounds and naphtha hydrocarbons, on one side of the membrane to cause said at least one liquid to permeate the membrane; and c) removing from the opposite side of the membrane a permeate liquid composition comprising a portion of said at least one liquid which permeated said membrane.

2. The process of claim 1 wherein said microporous material consists essentially of organic macromolecules comprised of first generally planar species connected by rigid linkers predominantly to a maximum of two other said first species, said rigid linkers having a point of contortion such that two adjacent first planar species connected by the linker are held in non-coplanar orientation.

3. The process of claim 2 wherein said point of contortion is provided by a substituted or unsubstituted spiro-indane, bicyclo-octane, biphenyl or binaphthyl moiety.

4. The process of claim 2 wherein each of the first planar species comprises at least one aromatic ring.

5. The process of claim 2 wherein each of the first planar species comprises a substituted or unsubstituted moiety of the formula:

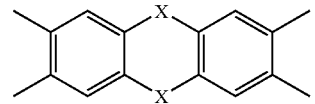

where X is O, S or NH.

6. The process of claim 2 wherein the microporous polymer material comprises repeating units of formula:

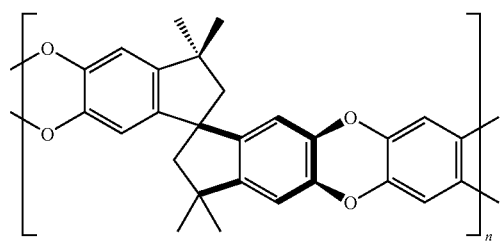

which may be substituted or unsubstituted.

7. The process of claim 2 wherein the microporous polymer material comprises repeating units of formula:

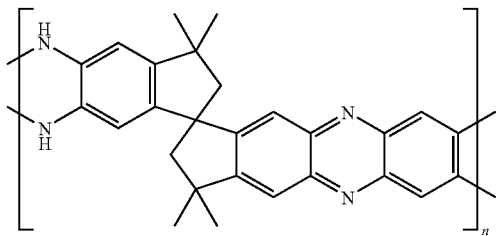

which may be substituted or unsubstituted.

8. The process of claim 2 wherein the microporous polymer material comprises repeating units of formula:

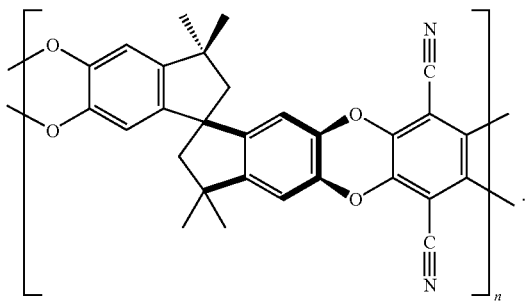

9. The process of claim 2 wherein the microporous polymer material comprises repeating units of formula:

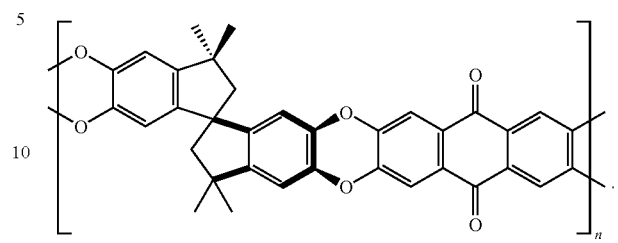

10. The process of claim 2 wherein the microporous polymer material comprises repeating units of formula:

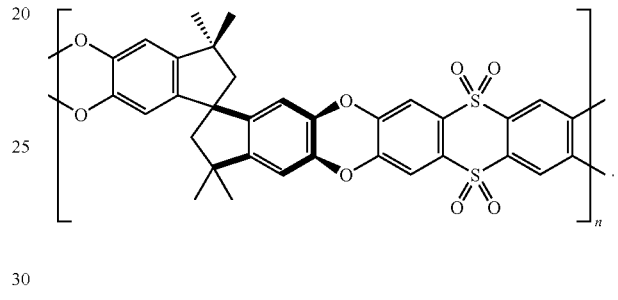

* * * * *